(12) United States Patent
Caspar et al.

(10) Patent No.: US 7,073,700 B2
(45) Date of Patent: Jul. 11, 2006

(54) PROCESS AND APPARATUS FOR APPLYING BRAZING MATERIAL TO A METALLIC STRUCTURE THROUGH THE USE OF VIBRATION

(75) Inventors: Hans-Peter Caspar, Troisdorf (DE); Ferdi Kurth, Mechernich (DE); Alex Scholz, Bonn (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/794,434

(22) Filed: Mar. 8, 2004

(65) Prior Publication Data

US 2004/0169065 A1 Sep. 2, 2004

Related U.S. Application Data

(63) Continuation of application No. PCT/EP02/09674, filed on Aug. 30, 2002.

(30) Foreign Application Priority Data

Sep. 7, 2001 (DE) .............................. 101 43 916

(51) Int. Cl.
*B23K 31/02* (2006.01)
*B23K 5/20* (2006.01)
*B23K 1/06* (2006.01)

(52) U.S. Cl. ................ 228/110.1; 228/1.1; 228/181; 228/246; 228/256

(58) Field of Classification Search ............... 228/1.1, 228/181, 182, 183, 246, 254, 256, 262; 29/890.03; 427/201, 346, 600
See application file for complete search history.

(56) References Cited

U.S. PATENT DOCUMENTS

| 2,389,175 | A | * | 11/1945 | Woods ................... 29/890.043 |
| 2,426,650 | A | * | 9/1947 | Sivian ......................... 228/262 |
| 3,479,731 | A | * | 11/1969 | Mantel et al. .............. 228/182 |
| 3,656,224 | A | * | 4/1972 | Blair et al. ................. 228/181 |
| 3,722,071 | A | * | 3/1973 | Van Orsdel ................ 228/181 |
| 4,230,251 | A | * | 10/1980 | Braconi et al. ............... 228/41 |
| 4,381,590 | A | | 5/1983 | Nonnenmann et al. |
| 4,521,947 | A | * | 6/1985 | Nonnenmann et al. ....... 29/890 |
| 4,803,189 | A | | 2/1989 | Swars |
| 5,431,330 | A | | 7/1995 | Wieres |
| 5,431,332 | A | * | 7/1995 | Kirby et al. ................ 228/246 |
| RE35,063 | E | * | 10/1995 | Sadano et al. ............. 228/258 |
| 5,501,391 | A | | 3/1996 | Wieres |
| 5,556,023 | A | * | 9/1996 | Kuramoto et al. ....... 228/248.1 |
| 6,138,562 | A | * | 10/2000 | Hertz et al. ................. 101/129 |
| 6,143,374 | A | * | 11/2000 | Cairncross et al. ......... 427/533 |
| 6,425,517 | B1 | | 7/2002 | Wieres et al. |
| 6,497,039 | B1 | | 12/2002 | Wieres et al. |
| 6,634,542 | B1 | | 10/2003 | Wieres |

(Continued)

FOREIGN PATENT DOCUMENTS

CA    1279204    3/1987

(Continued)

*Primary Examiner*—Lynne R. Edmondson
(74) *Attorney, Agent, or Firm*—Laurence A. Greenberg; Werner H. Stemer; Ralph E. Locher

(57) ABSTRACT

A process and an apparatus for applying a brazing material to a metallic structure, especially a honeycomb body, include bringing the metallic structure into contact with a pulverulent brazing material in such a way that the brazing material at least partially adheres to the metallic structure. The metallic structure and/or the brazing material are made to vibrate, at least when they are in contact.

18 Claims, 5 Drawing Sheets

U.S. PATENT DOCUMENTS

| | | | |
|---|---|---|---|
| 6,811,071 B1 * | 11/2004 | Caspar et al. | 228/182 |
| 2001/0013390 A1 | 8/2001 | Staubwasser | |
| 2002/0129890 A1 | 9/2002 | Staubwasser | |
| 2005/0266207 A1 * | 12/2005 | Ohara | 428/116 |

FOREIGN PATENT DOCUMENTS

| | | |
|---|---|---|
| CA | 1296315 | 5/1987 |
| DE | 29 24 592 A1 | 1/1981 |
| DE | 693 17 033 T2 | 5/1994 |
| DE | 198 23 000 A1 | 11/1999 |
| EP | 0 245 738 A1 | 11/1987 |
| EP | 0 595 343 B1 | 5/1994 |
| EP | 0 658 390 A1 | 6/1995 |
| GB | 2 051 624 A | 1/1981 |
| JP | 63-157758 A * | 6/1988 |
| RU | 582926 | 12/1977 |
| RU | 841874 | 6/1981 |
| RU | 1637965 A1 | 3/1991 |
| WO | 89/11938 | 12/1989 |
| WO | 93/25339 | 12/1993 |
| WO | 94/06594 | 3/1994 |
| WO | 99/37432 | 7/1999 |

* cited by examiner

PROCESS AND APPARATUS FOR APPLYING BRAZING MATERIAL TO A METALLIC STRUCTURE THROUGH THE USE OF VIBRATION

CROSS-REFERENCE TO RELATED APPLICATION

This application is a continuation of copending International Application No. PCT/EP02/09674, filed Aug. 30, 2002, which designated the United States.

BACKGROUND OF THE INVENTION

Field of the Invention

The present invention relates to a process and an apparatus for applying a pulverulent brazing material to a metallic structure. Examples of metallic structures of that type include honeycomb bodies, which are used in particular as catalyst carrier bodies, storage material carrier bodies or filter elements for purifying exhaust gases from mobile internal combustion engines.

Metallic honeycomb bodies are produced, for example, by stacking and/or winding sheet-metal layers, at least some of which are structured sheet-metal layers. Various configurations are known, as described, for example, in European Patent Application 0 245 738 A1, corresponding to Canadian Patent Applications 1296315 and 1270204. The stacked and/or wound sheet-metal layers are at least partially brazed to one another, so that a monolithic honeycomb body is formed. It is known that the honeycomb body is at least partially brazed to a tubular casing in which it is disposed. For that purpose, the brazing material is introduced into the brazing regions of the sheet-metal layers and of the tubular casing. Known processes for applying a bonding agent and brazing material to a metallic configuration of that type including a honeycomb body and a tubular casing are described, for example, in International Publication WO 89/11938, corresponding to U.S. Patent Application Publication Nos. 2002/129890 A1 and 2001/013390 A1; International Publication WO 94/06594, corresponding to U.S. Pat. No. 5,501,391; International Publication WO 93/25339, corresponding to U.S. Pat. No. 5,431,330; International Publication WO 99/37432, corresponding to U.S. Pat. Nos. 6,634,542, 6,497,039 and 6,425,517; and German Published, Non-Prosecuted Patent Application 29 24 592, corresponding to UK Patent Application GB 2 051 624 A.

According to International Publication WO 99/37432, corresponding to U.S. Pat. Nos. 6,634,542, 6,497,039 and 6,425,517, it is proposed that first of all a honeycomb body be formed by stacking and/or winding sheet-metal layers, at least some of which are structured sheet-metal layers, in such a way that the honeycomb body has passages through which a fluid can flow. The honeycomb body is partially introduced into a tubular casing. That section of the honeycomb body which projects from the tubular casing is brought into contact with a bonding liquid at its end side. Then, the honeycomb body is introduced into the tubular casing, after which it is brought into contact with a brazing material.

Honeycomb bodies of that type are usually exposed to very high fluctuating thermal and dynamic loads in the exhaust system of an internal combustion engine. The greatly varying temperatures in the exhaust system lead to differing expansion of the sheet-metal layers which form the honeycomb structure and of the tubular casing surrounding the sheet-metal layers. In order to avoid thermal stresses which present a danger to the structural integrity of the honeycomb body and also to ensure permanent fixing of the sheet-metal layers in the tubular casing, it is known for only partial regions of the sheet-metal layers to be brazed to one another and for only partial regions of the sheet-metal layers to be brazed to the tubular casing. In that context, it is particularly important for those partial regions which are to be brazed to one another to be sharply delimited from the partial regions of the honeycomb body which can undergo free thermal expansion.

Due to the fact that the passage walls in the interior of the honeycomb body are ultimately still provided with a catalytically active or surface area-increasing coating, and the current technical trend is toward very thin sheet-metal foils with a high passage density, it is desirable for the passage cross section not to be reduced by excessive accumulation of brazing material. In particular, the passages should only take up sufficient brazing material on one hand for the adjacent sheet-metal foils which are to be brazed to one another to be permanently joined to one another and on the other hand to provide sufficiently large areas of the passage walls which are free of brazing material and are therefore suitable for the application of a further coating.

SUMMARY OF THE INVENTION

It is accordingly an object of the invention to provide a process and an apparatus for applying brazing material to a metallic structure, in particular a honeycomb body with passage walls and passages, through the use of vibration, which overcomes the hereinafore-mentioned disadvantages of the heretofore-known devices and methods of this general type, which produces sharply delimited brazing regions, reduces the quantity of brazing material required and can ensure permanent bonding of the passage walls even when the honeycomb body is subject to high thermal and dynamic loads. Furthermore, the process should be particularly simple to carry out and should be suitable for large-series production of metallic structures of that type. In addition, the brazing material-application apparatus should be a particularly simple structure, which can be operated in various ways and ensure a uniform distribution of the brazing material inside the metallic structure.

With the foregoing and other objects in view there is provided, in accordance with the invention, a process for applying brazing material to a metallic structure, in particular a honeycomb body. The process comprises bringing the metallic structure into contact with a pulverulent brazing material causing the brazing material to at least partially adhere to the metallic structure. The metallic structure and/or the brazing material is vibrated at least while the metallic structure and the brazing material are in contact.

In accordance with another mode of the invention, the metallic structure is held by a gripper and/or a manipulator arm at least during contact, with the vibration being transmitted through the gripper and/or manipulator arm. Alternatively, it is also possible for the brazing material to be inside a vessel and for the vibration to be transmitted through the vessel. External stimulation of the brazing material through the use of a pulse emitter can also be used under certain circumstances. The term metallic structure is to be understood in particular as meaning structures with passages and/or openings through which a fluid can flow and which have a plurality of individual parts (casing, metal sheets, foils, fabrics, meshes, fibers, wires, etc.) that are technically joined to one another through the use of a brazing operation. In this case, the individual parts delimit or define the passages or openings which ensure that fluid can flow through the structure.

In accordance with a further mode of the invention, the vibration of the metallic structure and/or the brazing material also means that the brazing material preferably accumulates in the regions of contact of the adjacent walls which are to be joined, is forced into these regions and is then fixed in place. These contact regions usually form pockets, edges, gaps or the like, with the brazing material, when it accumulates there, preferably being simultaneously in contact with two adjacent passage walls. In this way, the brazing material is permanently fixed, ensuring that the brazing material, during subsequent formation of the connection by technical joining, while a high-temperature treatment of the metallic structure is ongoing, is disposed exactly at the walls which are to be connected to one another. Brazing or soldering processes have proven to be a suitable technique for connecting by technical joining. However, a sintering process or even welding may be used as well.

In accordance with an added mode of the invention, the metallic structure is a metallic honeycomb body with passage walls and passages. The passages adjoin at least one end face of the honeycomb body and at least in the vicinity of this end face run parallel to an axis. The process for applying brazing material serves primarily to bring the honeycomb body into contact with a brazing material, in particular in powder form, in such a way that the brazing material adheres at least partially at the passage walls in the passages. In this context, it is proposed for the honeycomb body and/or brazing material to vibrate at least while they are in contact with one another. Vibration encompasses, for example, oscillation, rotation, translational relative movements or the like, wherein the brazing material is briefly subjected to acceleration or velocity in the direction of the passage walls relative to the metallic structure.

In accordance with an additional mode of the invention, the vibration has the further advantage that the brazing material which has not been jammed in as outlined above and in particular is only in contact with one passage wall is thrown out again or released due to the pulsed momentum of the brazing material particles which can still move freely inside the passages. The particles of the brazing material preferably have a mean particle size of 20 µm to 120 µm, in particular between 25 µm and 100 µm. This prevents the passage cross section from being reduced as a result of accumulations of brazing material which are disposed at a position that is unsuitable for connecting adjacent passage walls through the use of technical joining. This in particular has positive effects with regard to the pressure loss in a honeycomb body of this type when a fluid flows through it.

In accordance with yet another mode of the invention, the honeycomb body and the brazing material vibrate rotationally with respect to one another, with preferably the entire end face of the honeycomb body executing a motion relative to the brazing material. This is to be understood as meaning that in addition to pure rotation or rotary vibration of the honeycomb body and/or a brazing material disposed in a vessel, it is also possible for further relative motions to be superimposed. This in particular generates movement paths which are preferably continuous and lead to a relative motion between passage walls and brazing material in each partial region of the end face of the honeycomb body. This statement should also apply in particular for partial regions of the honeycomb body which are disposed close to the axis of rotation of the honeycomb body or of the vessel. The forms of vibration as a rotational oscillation have the advantage that an installation used to carry out the rotary oscillation of this nature can be of particularly compact structure, and therefore the process is especially suitable for large-series production or mass production of honeycomb bodies.

In accordance with yet a further mode of the invention, the vibration takes place with a constant amplitude. In this context, the term amplitude is to be understood as meaning, for example, the maximum movement of a passage wall in the vibration direction caused by the vibration. The vibration operation is commenced in particular even before the metallic structure and brazing material come into contact, with any fluidizing of the brazing material which may be present, e.g. through the use of air, preferably also being switched off in advance. The vibration operation, which is preferably generated by vibration of the metallic structure, is preferably only ended after the metallic structure has been removed from the brazing material. Consequently, the vibration operation preferably only lasts less than five seconds, in particular less than three or two seconds, and under certain circumstances even less than one second. The amplitude is in this case in particular in a range between 0.1 mm and 3 mm, preferably between 0.2 mm and 1.0 mm.

In accordance with yet an added mode of the invention, the frequency is changed during the vibration. Due to the fact that, in particular in the case of brazing material in powder form, brazing material particles of different sizes are encountered, varying the frequency results in particularly good accumulation of the brazing material particles in the contact regions of the adjacent passage walls. The frequency is in this case preferably between 20 Hz and 100 Hz, in particular between 25 Hz and 50 Hz.

In accordance with yet an additional mode of the invention, the brazing material and/or the metallic structure additionally carry out an immersing motion in the axial direction during the vibration. This leads to particularly intensive contact between the brazing material and the contact regions of adjacent passage walls.

In accordance with again another mode of the invention, the regions of the metallic structure to which the brazing material is intended to adhere are particularly preferably at least partially provided with a bonding agent, in order to ensure permanent fixing of the brazing material in the desired regions prior to the brazing operation. In this case, the bonding agent is expediently disposed at all of the passage walls of the brazing region of the metallic structure.

In accordance with again a further mode of the invention, brazing material is only applied up to a predeterminable height starting from an end face of the metallic structure. This defines an end-side brazing region, while partial regions of the metallic structure which lie further inward are not ultimately connected to one another by technical joining, and consequently differing thermal expansion is made possible there.

In accordance with again an added mode of the invention, if it is desirable for brazing material to be applied at both ends of the metallic structure, the metallic structure is moved in relation to the brazing material after they have been brought into contact with one another, and the operation of applying brazing material is repeated from the other end face of the metallic structure. This results in brazing regions in the vicinity of the end faces, whereas a partial region in the interior of the metallic structure can expand or contract freely, for example as a result of fluctuating thermal loads.

In accordance with again an additional mode of the invention, the metallic structure continues to vibrate for a predeterminable time after it has been brought into contact with the brazing material. In this case, it is also possible to carry out a final, at least partial, cleaning of the passage walls, in particular through the use of a fluid flowing through the passages. The subsequent vibration as well as the flow of a fluid through the passages ensures that brazing material is disposed only in the regions of contact between adjacent passage walls or in the regions of contact between the passage walls and a tubular casing surrounding them.

In accordance with still another mode of the invention, if the metallic structure, which is constructed, for example, as a honeycomb body, has at least partially structured sheet-metal foils, so that passages with pockets and sides or flanks are formed, vibration of this nature takes place in such a way that the brazing material accumulates substantially only in the pockets. The pockets in this case form the contact regions between the adjacent, at least partially structured sheet-metal foils. In this case, the nature of the vibration and its amplitude and/or frequency can be matched to the brazing material used (particle size, additives, etc.). The sides or flanks, which serve in particular for the accumulation of a catalytically active or surface area-increasing coating, therefore remain free of brazing material.

With the objects of the invention in view, there is also provided an apparatus for applying a pulverulent brazing material to a metallic structure. The apparatus comprises a vessel for holding the pulverulent brazing material, a manipulator arm for holding the metallic structure, and a device for generating vibration in the metallic structure and/or the pulverulent brazing material.

The apparatus is accordingly suitable in particular for carrying out the processes described above. The apparatus has a very simple structure and, due to the vibration feature, ensures very good bonding of the grains of brazing material in the corresponding regions of the metallic structure, which are then to be connected to one another during the brazing operation, even during large series production.

The device for generating vibration may be disposed and constructed in a very wide variety of ways. The embodiments given below merely represent a few examples of general, theoretical alternatives and are not to be considered as imposing any restriction on the invention. The various components of the apparatus may be excited, for example, directly or through transmitting components. For example, it is proposed, inter alia, for a vibrator to be connected to the vessel. Alternatively or in combination with this measure, it is also possible for a vibrator to be directly or indirectly connected to the metallic structure. In this case, the vibrator is in particular part of the manipulator arm or an associated gripper itself. If movement of the brazing vessel and/or manipulator arm is to be avoided, so that reduced forces and energies are required to generate targeted vibration, it is possible to provide a pulse emitter which is at least partially responsible for vibrating the pulverulent brazing material. Pulse emitters of this type may, for example, emit different and adjustable pressure waves and/or pulses, ensuring targeted vibration.

Other features which are considered as characteristic for the invention are set forth in the appended claims.

Although the invention is illustrated and described herein as embodied in a process and an apparatus for applying brazing material to a metallic structure through the use of vibration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
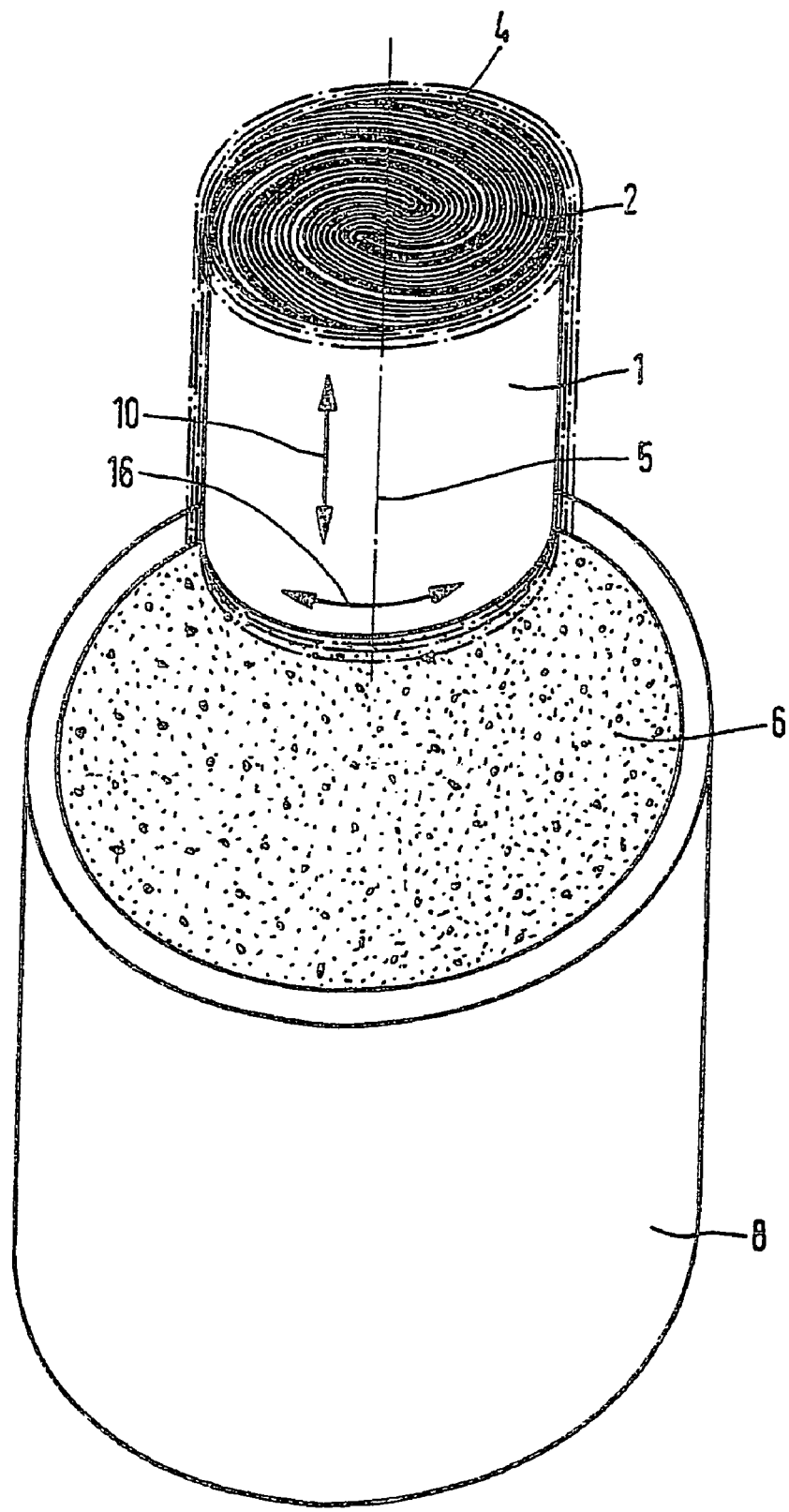
FIG. 1 is a diagrammatic, perspective view of a configuration of brazing material and a honeycomb body while a brazing material-application process is being carried out.

Referring now to the figures of the drawings in detail and first, particularly, to FIG. 1 thereof, there is seen a diagrammatic and perspective view of a vessel 8 holding pulverulent brazing material 6. In order for brazing material to be applied to a honeycomb body 1, the latter is moved relative to the brazing material 6, in an immersion direction 10, in such a way that the brazing material 6 is brought into contact with passage walls 2 of the honeycomb body 1. In this case, the brazing material 6 is introduced into passages 3 (specifically indicated in FIGS. 2, 4 and 5) in the honeycomb body 1 through one of two end faces 4. While they are being brought into contact, the honeycomb body 1 vibrates in a vibration direction 16, which is represented in this case as rotation about an axis 5.

Figure 2:
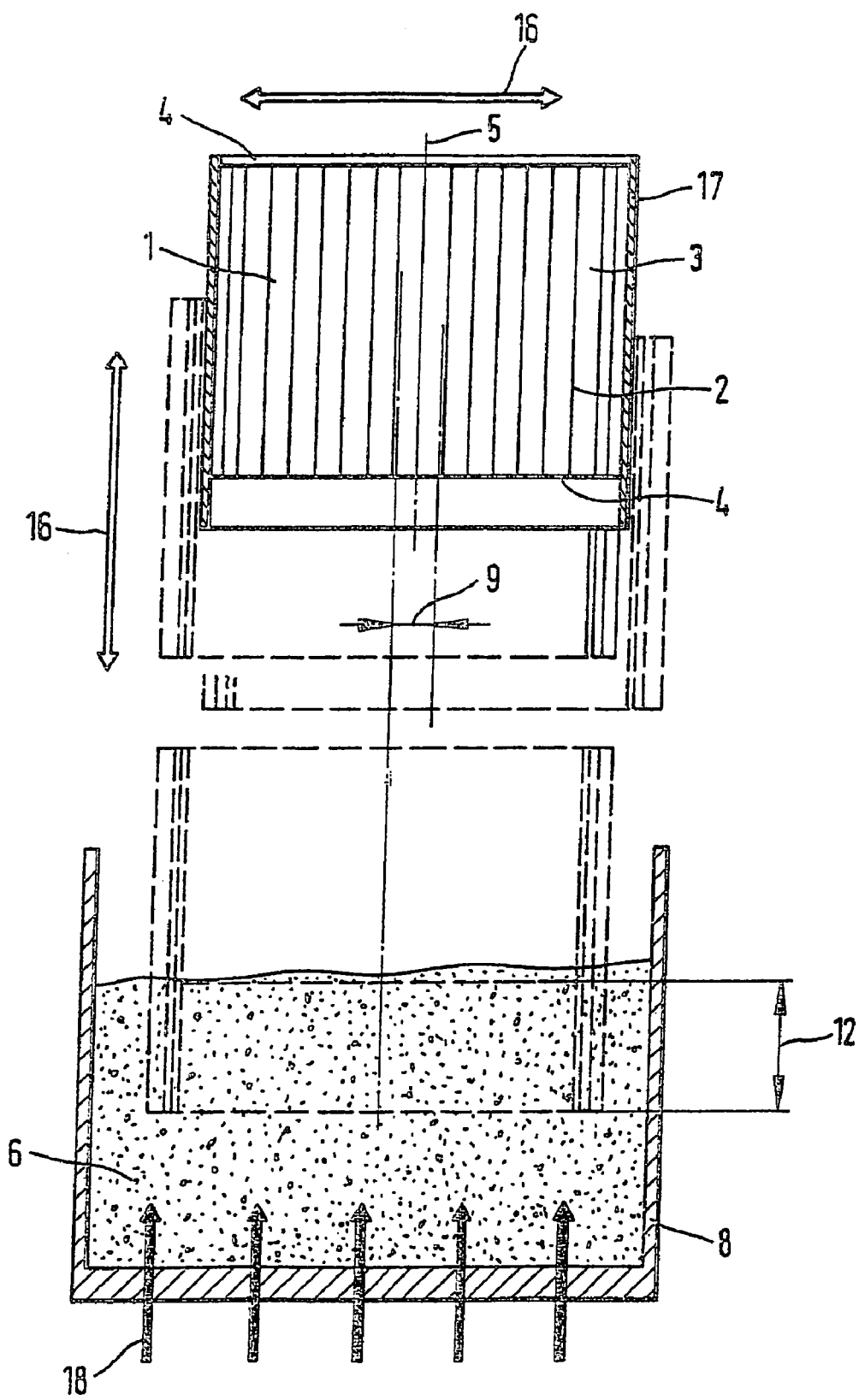
FIG. 2 is a longitudinal-sectional view depicting the brazing material-application process with a vibrating honeycomb body.

FIG. 2 diagrammatically depicts the operation of applying brazing material using a vibrating honeycomb body 1. The honeycomb body 1 includes the passage walls 2 which form the passages 3 disposed substantially parallel to the axis 5 of the honeycomb body. Furthermore, the honeycomb body 1 includes a tubular casing 17, which in the illustrated embodiment of the honeycomb body 1 projects beyond the two end faces 4. While the honeycomb body 1 is being immersed into the vessel 8 filled with the pulverulent brazing material 6, the honeycomb body vibrates horizontally and/or vertically (as indicated by arrows 16) with a predeterminable amplitude 9 and a frequency which is selected in particular as a function of the brazing material 6 being used. The operation of applying brazing material in this case is carried out in such a way that it is ensured that brazing material is applied to the passage walls 2 of the honeycomb body 1 up to a height 12. An air flow 18 can additionally be introduced into the brazing material powder to assist with the brazing material-application operation, helping the brazing material 6 to penetrate into the interior of the passages 3.

Figure 3:
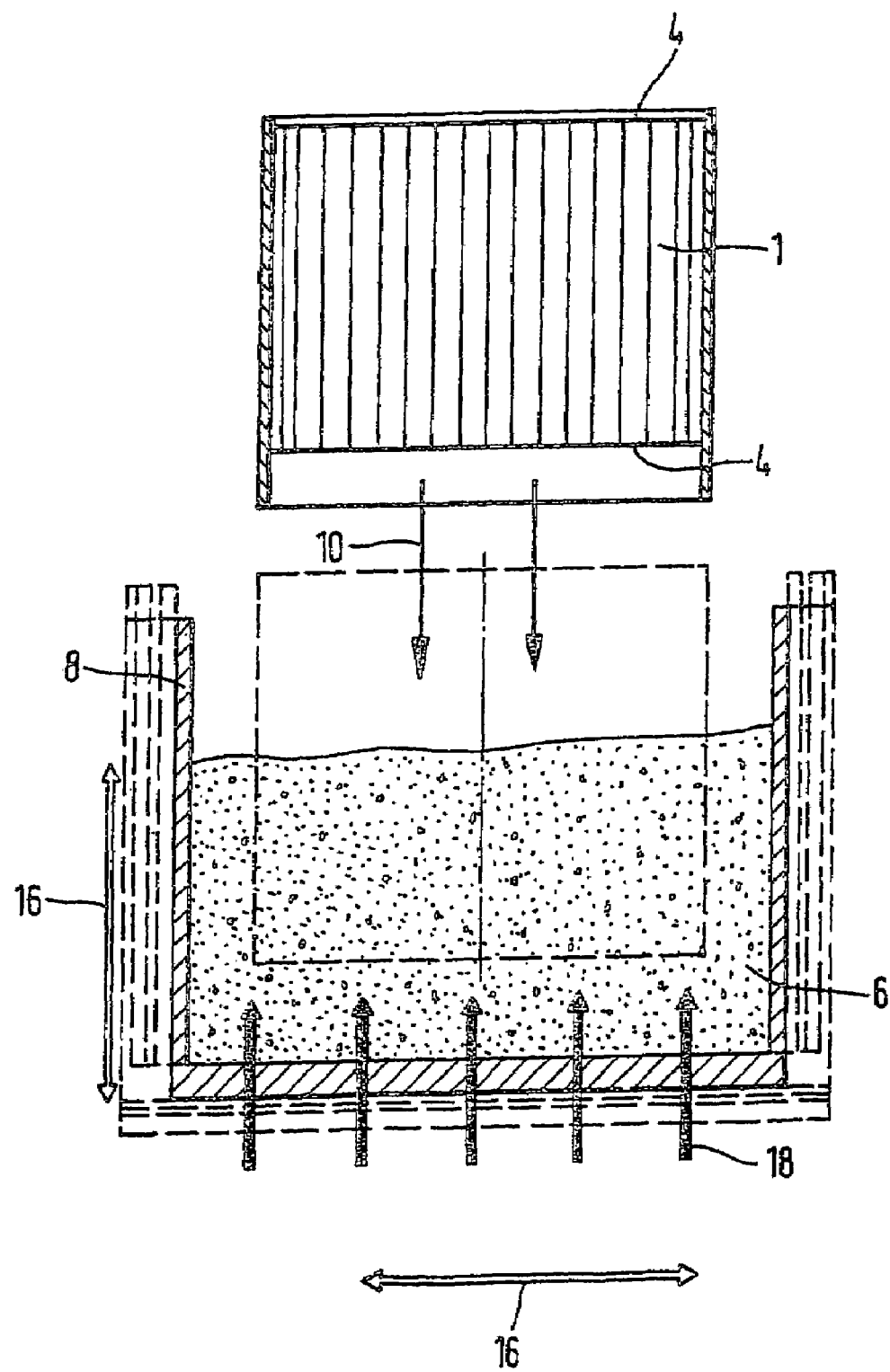
FIG. 3 is a further longitudinal-sectional view depicting a configuration of the brazing material-application process with vibrating brazing material.

FIG. 3 diagrammatically depicts the operation of applying brazing material in which the vessel 8 together with the brazing material 6 therein is made to vibrate. The vibration direction 16 is indicated by arrows. The honeycomb body 1 is moved in the immersion direction 10 by an end face 4 until the brazing material 6 comes into contact with the passage walls inside the honeycomb body 1. As soon as the end face

4 is in contact with the brazing material 6, the vibration of the vessel 8 and/or the brazing material 6 commences. In this case too, penetration of the pulverulent brazing material 6 into the passages 3 can be assisted by an air flow 18.

Figure 4:
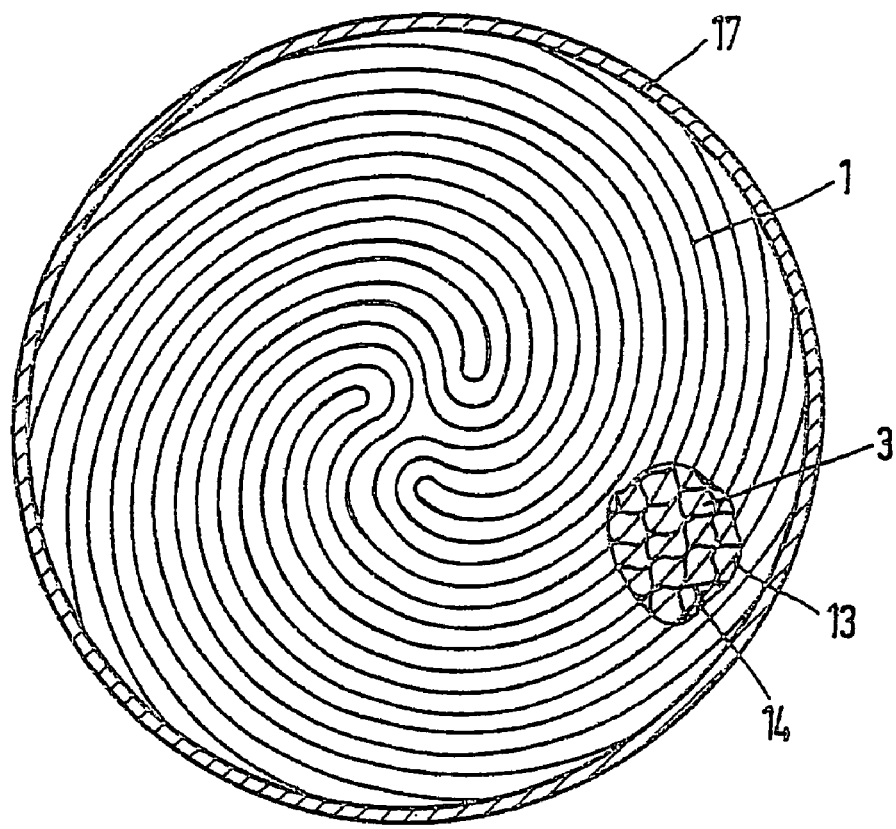
FIG. 4 is a fragmentary, cross-sectional view of a honeycomb body.

FIG. 4 shows a view of an end face 4 of a honeycomb body 1. The honeycomb body 1 includes a multiplicity of sheet-metal layers which are at least partially structured. The sheet-metal layers are wound and/or stacked together and disposed in the tubular casing 17. In order to form a connection by technical joining, predeterminable partial regions of the honeycomb body and/or the tubular casing 17 are provided with brazing material 6. During a subsequent high-temperature heat treatment, the brazing material 6 is liquefied and ensures a corresponding connection between the sheet-metal layers and the tubular casing 17 and/or between the individual sheet-metal layers. The heat treatment is preferably carried out under a reduced atmosphere, in particular a vacuum. In the embodiment illustrated, the passages 3 in the honeycomb body 1 are formed by smooth layers 13 and corrugated layers 14, which are then twisted or wound together to form a monolithic honeycomb body 1. This produces a passage density in the honeycomb body 1 which is preferably over 600 cpsi (cells per square inch), in particular even over 1000 cpsi.

Figure 5:
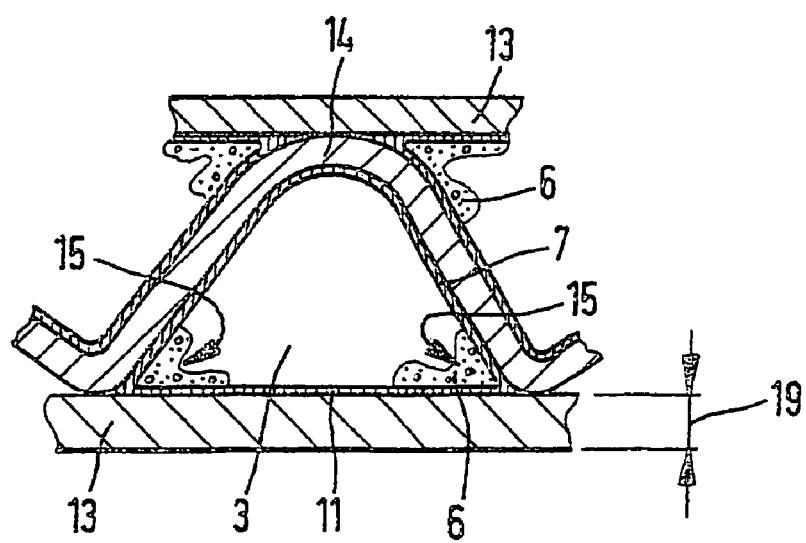
FIG. 5 is an enlarged, fragmentary, cross-sectional view of a passage of the honeycomb body provided with brazing material.

FIG. 5 diagrammatically depicts a fragmentary view of a passage 3 of the honeycomb body 1. The passage 3 is at least partially delimited by a smooth layer 13 and a corrugated layer 14. As a result of the alternate stacking of corrugated layers 14 and substantially smooth layers 13 (before the sheet-metal layers are wound together), pockets 15 and sides or flanks 7 are formed. In this case, the pockets 15 are formed by the adjacent smooth and corrugated sheet-metal layers 13, 14 and these contact regions are used predominantly to form joins.

The vibration during the process of applying brazing material therefore results in brazing material 6 being disposed preferentially and virtually exclusively in the pockets 15 of the passages 3. The sides 7 of the passage 3 remain substantially free of brazing material 6. Although the entire passage 3 is provided with a bonding agent 11, accumulations of brazing material which have formed at the sides 7 are discharged back out of the passages 3 as a result of the vibratory operation, since they have only a relatively small contact or bonding surface. This means that only a very small amount of brazing material 6 is required to form connections in the honeycomb body 1 by technical joining. This is also particularly advantageous with regard to the materials properties of the sheet-metal layers, since an excessive accumulation of brazing material may under certain circumstances lead to the sheet-metal layers 13, 14 becoming susceptible to corrosion, in particular if the corrugated layers 14 and/or smooth layers 13 have a thickness 19 of less than 0.03 mm, in particular less than 0.025 mm.

This thickness range represents the standard for honeycomb bodies 1 which are used in exhaust systems of automobiles. The surface area-specific heat capacity of the honeycomb body 1 in this case is kept relatively low, with the result that an improved cold-starting performance, i.e. rapid heating up to a defined activation temperature, is observed. If the honeycomb body is used, for example, as a carrier body for a catalytically active coating, the coating must rapidly reach a temperature of approximately 230° C. before it starts catalytic conversion of pollutants contained in the exhaust gas (i.e. hydrocarbons, carbon monoxides, nitrogen oxides). If the honeycomb body has a coating which is capable of storage, in particular for the adsorption of nitrogen oxides, in some cases thicknesses of the sheet-metal foils of over 0.03 mm up to approximately 0.1 mm should be used, since in this case the coating loses its storage or adsorption property at relatively high temperatures. Consequently, for this application, delayed heating of the honeycomb body 1 by the hot exhaust gas flowing through it is advantageous. If honeycomb bodies of this type are used as open or closed filters, sheet-metal thicknesses in a range between 0.08 and 0.02 mm are preferred.

During a high-temperature vacuum process which follows the brazing material-application process, the brazing material 6 which has accumulated in the pockets 15 is liquefied and preferably penetrates between the adjacent sheet-metal layers 13, 14. The bonding agent 11 which is still present on the passage walls 3 is evaporated during this high-temperature process. The free sides 7 of the passages 3 then serve to take up catalytically active or surface area-increasing coatings, such as for example washcoat.

The proposed brazing material-application process ensures in a very simple way that the amount of brazing material required can be reduced, yet nevertheless permanent bonding of adjacent passage walls of the honeycomb body is ensured. The vibration leads to brazing material accumulating only in the contact regions between the adjacent passage walls, while the passage walls themselves remain substantially free of brazing material.

Figure 6:
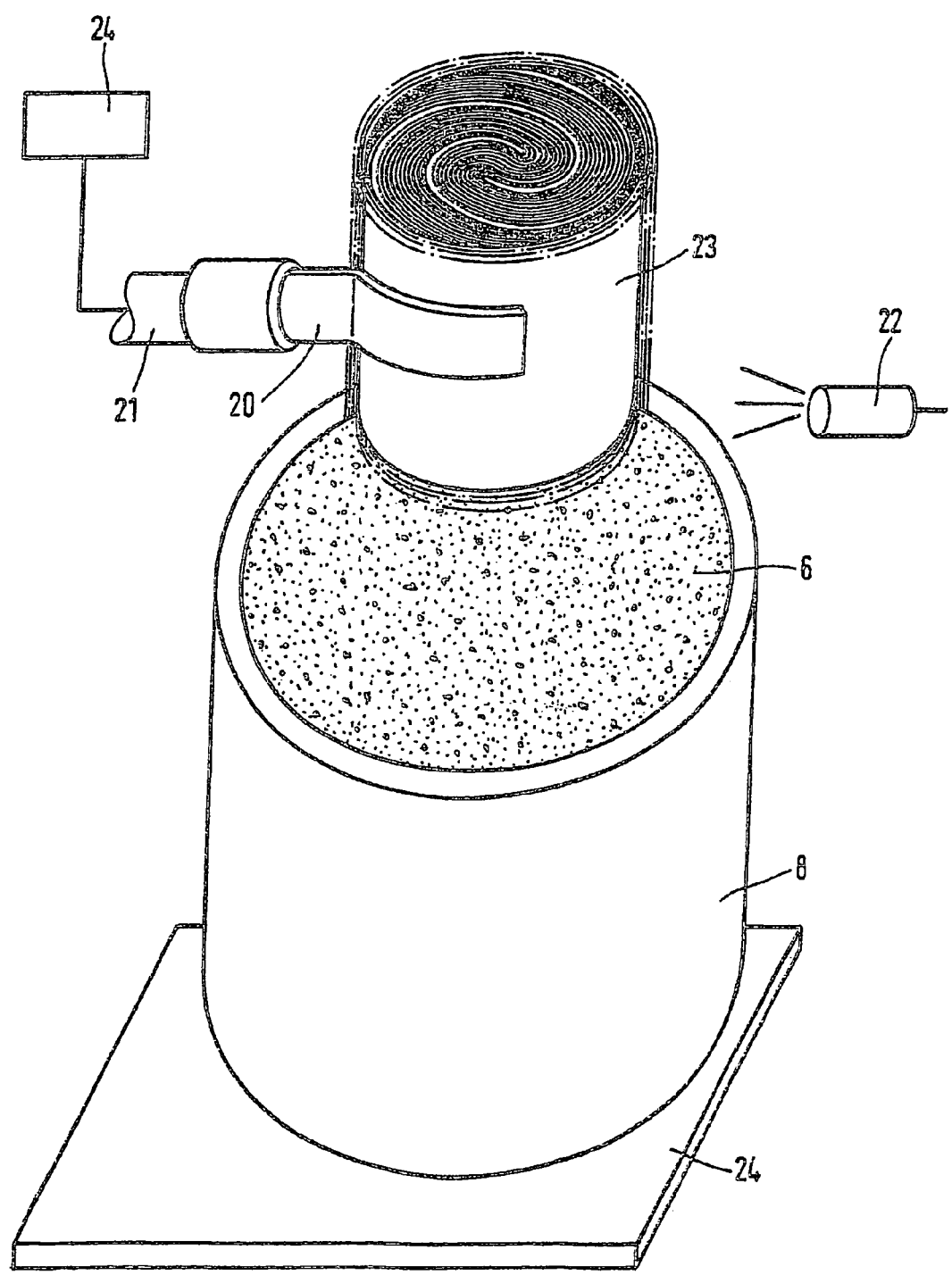
FIG. 6 is a perspective view of an embodiment of an apparatus according to the invention.

FIG. 6 diagrammatically depicts one embodiment of the apparatus according to the invention. The illustrated apparatus is suitable for carrying out a process for applying brazing material to a metallic structure 23. The metallic structure 23 is brought into contact with a pulverulent brazing material 6 in such a way that the brazing material 6 at least partially adheres to it, and the metallic structure 23 and/or the brazing material 6 are made to vibrate at least while they are in contact with one another. For this purpose, the metallic structure 23, at least while it is in contact with the brazing material, is held by a manipulator arm 21 which has a gripper 20. The manipulator arm 21 is connected to a vibrator 24, so that the vibration is transmitted through the gripper 20 and/or the manipulator arm 21 to the metallic structure 23. In addition, vibration can be transmitted through a vibrator 24 connected to the vessel 8. Furthermore, the illustrated apparatus has a pulse emitter 22 which causes the pulverulent brazing material 6 to vibrate. This pulse emitter 22 is able to emit one or more targeted pulses onto partial regions of the metallic structure 23 without being directly connected to or in contact with the latter. Examples of suitable vibrators 24 or pulse emitters 22 of this type include piezocrystals, structure-borne sound generators, acoustic pressure generators, mechanical oscillators or the like. The vibrator 24 and/or the pulse emitter 22 provide a device for generating vibration in the metallic structure 23 and/or the pulverulent brazing material 6.

We claim:

1. A process for applying brazing material to a metallic structure, which comprises:
   forming a metallic structure as a honeycomb body having a plurality of individual parts defining passages through which a fluid can flow and passage walls having regions of contact which are to be joined;
   bringing the metallic structure into contact with a pulverulent brazing material causing the brazing material to at least partially adhere to the metallic structure;
   vibrating at least the metallic structure at least during the step of bringing the metallic structure into contact with the pulverulent brazing material; and
   carrying out the vibrating step by holding the metallic structure with at least one of a gripper and a manipulator arm and by transmitting vibration to the metallic structure through at least one of the gripper, the manipulator arm and a pulse emitter emitting a frequency of vibration between 20 Hz and 100 Hz and an amplitude of vibration in a range between 0.1 mm and 3 mm, thereby forcing the brazing material accumulated in the regions of contact of the adjacent passage walls into the regions of contact and being fixed in place.

2. The process according to claim 1, which further comprises placing the brazing material inside a vessel, and carrying out the vibrating step by transmitting vibration through the vessel.

3. The process according to claim 1, which further comprises:
   providing the metallic structure as a honeycomb body having an axis, an end face, passage walls and passages adjoining the end face and extending parallel to the axis; and
   carrying out the vibrating step by rotationally vibrating the honeycomb body and the brazing material relative to one another.

4. The process according to claim 3, which further comprises carrying out the vibrating step by executing a motion relative to the brazing material with the entire end face of the honeycomb body.

5. The process according to claim 1, which further comprises carrying out the vibrating step by vibrating with a constant amplitude.

6. The process according to claim 1, which further comprises carrying out the vibrating step with a frequency of vibration changing during the vibration.

7. The process according to claim 1, which further comprises executing an immersing motion in axial direction of the metallic structure with at least one of the brazing material and the metallic structure.

8. The process according to claim 1, which further comprises providing at least regions of the metallic structure to which brazing material is intended to adhere with a bonding agent prior to application of the brazing material.

9. The process according to claim 1, which further comprises carrying out the step of bringing the metallic structure into contact with the brazing material by applying the brazing material only up to a predeterminable height starting from an end face of the metallic structure.

10. The process according to claim 1, which further comprises moving the metallic structure relative to the brazing material from one end face of the metallic structure after the step of bringing the metallic structure into contact with the brazing material, and repeating application of the brazing material from another end face of the metallic structure.

11. The process according to claim 1, which further comprises continuing to vibrate the metallic structure for a predeterminable time after the metallic structure has been brought into contact with the brazing material.

12. The process according to claim 1, which further comprises at least partially cleaning the metallic structure while removing excess brazing material from the metallic structure.

13. The process according to claim 1, which further comprises at least partially cleaning the metallic structure while removing excess brazing material from the metallic structure with a fluid flowing through the metallic structure.

14. The process according to claim 1, which further comprises constructing the metallic structure as a honeycomb body having at least partially structured sheet-metal foils defining passages forming pockets, and substantially accumulating the brazing material in the pockets as a result of the vibrating step.

15. An apparatus for applying a pulverulent brazing material to a metallic structure according to the process of claim 1, comprising:
    a vessel for holding the pulverulent brazing material;
    a manipulator arm for holding the metallic structure; and
    a device for generating vibration in at least the metallic structure, said device for generating vibration being at least one of a vibrator connected to the metallic structure and a pulse emitter for carrying out a vibration frequency between 20 Hz and 100 Hz and a vibration amplitude between 0.1 mm and 3 mm.

16. The apparatus according to claim 15, wherein said device for generating vibration is a vibrator connected to said vessel.

17. The apparatus according to claim 15, wherein said vibrator is part of said manipulator arm.

18. The apparatus according to claim 16, wherein said device for generating vibration is a pulse emitter for vibrating the pulverulent brazing material.

* * * * *